April 6, 1954  D. C. MEYERS ET AL  2,674,434
APPARATUS FOR METERING OIL FIELD PRODUCTION Filed May 24, 1952  2 Sheets-Sheet 1

Inventors: L.E. Slagle
D.C. Meyers
By: [signature]
Their Attorney

April 6, 1954        D. C. MEYERS ET AL        2,674,434
APPARATUS FOR METERING OIL FIELD PRODUCTION
Filed May 24, 1952                                2 Sheets-Sheet 2
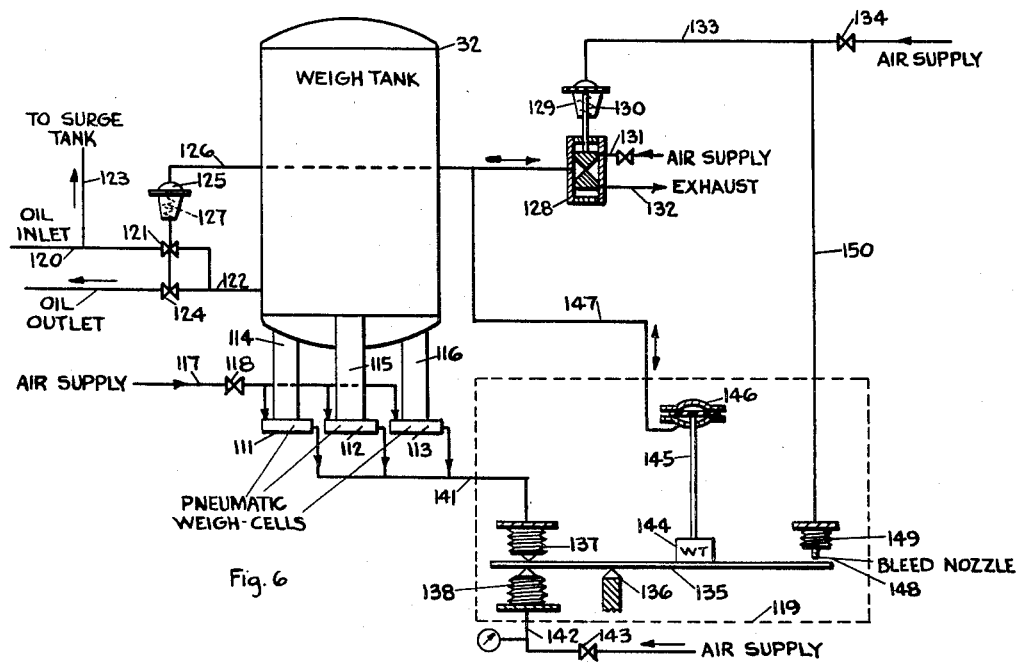
Fig. 6
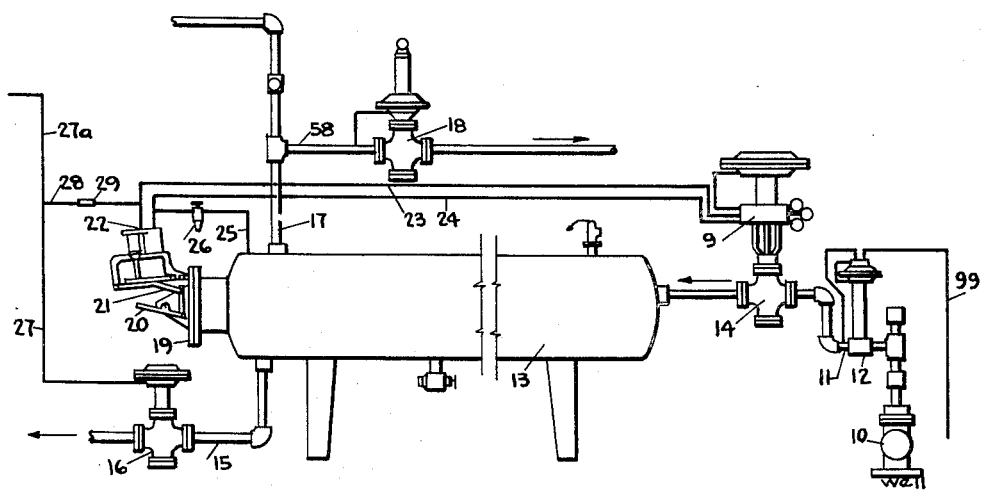
Fig. 2
Inventors: L. E. Slagle
D. C. Meyers
Their Attorney

Patented Apr. 6, 1954

2,674,434

UNITED STATES PATENT OFFICE

2,674,434

APPARATUS FOR METERING OIL FIELD PRODUCTION

Douglas C. Meyers, Midland, Tex., and Lucian E. Slagle, Hobbs, N. Mex., assignors to Shell Development Company, Emeryville, Calif., a corporation of Delaware Application May 24, 1952, Serial No. 289,922

12 Claims. (Cl. 249—2)

This invention relates to the metering of liquids and pertains more particularly to apparatus for automatically weighing successive increments of crude oil fluid which is normally produced from a well as a mixture of oil and gas.

When oil is being produced from a field made up of a number of leases which are owned by different parties, it is essential for bookkeeping and other purposes that the production from each well, or the production from all the wells on one lease, be measured accurately. This is normally accomplished by employing lease tanks which are sufficiently large to hold one or more days production. The present conventional tank batteries are not only expensive in their initial cost but also entail the use of considerable manual labor in their operation.

For example, it is necessary at periodic intervals for a pumper or gauger to measure, sample and then drain the lease tanks which are full, while the production fluid is directed to an adjacent lease tank which is empty. By taking tank measurements each day, the daily production of the lease may be calculated. However, the production figures obtained from tank measurements may be in error due to differences in temperature at the times when two consecutive tank readings are taken. Thus, it is also necessary to record the temperature at the time a tank measurement is taken so that the volume of fluid in the tank can be corrected for temperature errors.

It is therefore a primary object of the present invention to provide apparatus for metering oil field production, the operation of said apparatus being unaffected by changes in temperature.

A further object of this invention is to provide low cost automatic metering apparatus for oil field production which may be left unattended for long periods of time during which time the volume of fluid passing through said apparatus is automatically sampled, weighed, and the volume recorded. Preferably, a predetermined weight of oil passes through the apparatus on each cycle whereby the total volume may be determined by recording the number of operating cycles and multiplying this number by the weight per cycle.

The presently available fluid meters are of the positive volume displacement type. These meters are not practical for accurate measurement of crude oil as it is discharged from a well borehole due to the fact that a large volume of gas may be produced with and entrained in the crude oil, sometimes in the form of emulsions. It is therefore another object of this invention to provide apparatus for accurately metering oil field production which comprises a crude oil which may have substantial quantities of a gas entrained therein.

These and other objects of this invention will be understood from the following description taken with reference to the attached drawing, wherein:

Figures 1 and 2 taken together form a view illustrating the metering apparatus of the present invention positioned at a well head together with gas separation apparatus.

Figure 6 is a diagrammatic sketch illustrating the metering apparatus of the present invention utilizing pneumatic weighing means.

Figure 1:
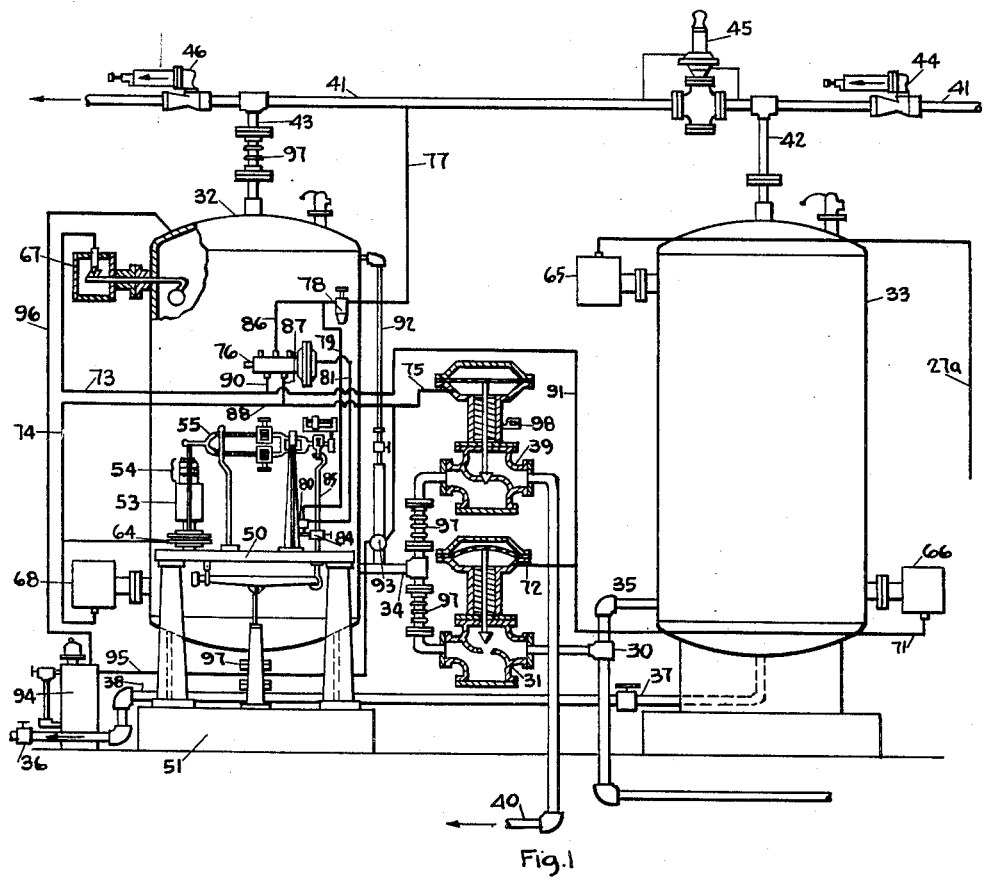

Referring to Figures 1 and 2 of the drawing, a portion of an assembly of control fittings at the well head, commonly known as a "Christmas tree," is shown at 10, including a pipe line 11 having a diaphragm type control valve 12 therein for discharging well fluid from the well borehole. The flow of well fluid may be passed from the discharge line 11 through one or more separators in which the major portion of gas is separated from the crude oil.

In the illustrated installation, the discharge line 11 is connected to a horizontal separator 13. The pipe line 11 is provided with a control valve 14 for regulating the flow of fluid into the separator. The separator 13 is equipped with an oil discharge line 15 having a diaphragm-type control valve 16 therein and a gas discharge line 17 having a back pressure valve 18 therein for maintaining the desired pressure on the separator 13. Mounted on the manhole cover 19 at one end of the separator is a float-type fluid level control device (not shown) which extends through the cover 19 in a manner to actuate linkage arms 20 and 21 and a float-controlled pilot valve 22 mounted adjacent the cover.

The tank battery shown in Figures 1 and 2 utilizes pneumatically controlled valves but it is to be understood that a system of either electrically operated or hydraulically operated valves could be employed. The float-operated control valve 22 is in pressure communication with inlet valve 14 through tubings 23 and 24, with the separator 13 through tubing 25 and a pilot gas supply regulator and trap 26, and with the discharge valve 16 through conduits 27 and 28, the latter conduit being preferably provided with a choke nipple 29 for limiting the amount of pressure fluid to the separator dump valve 16.

The oil line 15 from the separator is preferably provided with a T 30 whereby oil may be discharged through a valve 31 into a scale tank 32 or into a surge tank 33. The inlet lines 34 and 35 to the tanks 32 and 33 preferably enter the tanks at a point slightly above the bottom thereof to permit the accumulation of sediment in the bottom of each tank. The sediment can be removed from the tanks 32 and 33 at any time the metering system is shut down by operating valves 36 and 37 in the sludge line 38 from the tanks.

The normal discharge of oil from the scale tank 32 is through line 34, a pressure-controlled discharge valve 39 and thence through a fluid discharge line 40 which may lead to a pipe line or to central storage tanks (not shown). The gas discharge line 17 of the separator 13 may be connected by a common pipe line 41 with the gas discharge lines 42 and 43 of the surge tank 33 and scale tank 32, respectively. The common gas line 41 is preferably provided with a regulator 44 between the surge tank 33 and the separator 13 for reducing the separator pressure to the pressure desired in the surge tank 33. Similarly, a differential pressure controller 45 may be positioned in line 41 between the scale tank 32 and the surge tank 33 in order to maintain the desired differential pressure between the scale and surge tanks. A relief valve 46 is also provided in the gas line 41 between the scale tank 32 and the discharge end of the line 41 to maintain the desired back pressure on the scale tank 32.

The scale tank 32 is mounted, as illustrated, on the platform 50 of a self-contained floor scale 51 which is well known to the art and may be provided with automatic taring means. The tank 32 may be supported on the platform 50 in any suitable manner. A pair of weights 53 and 54 are hung from the beam 55 of the scale tank in a manner more clearly illustrated in Figure 3. One weight 53, which is a counterweight equivalent to the tare weight of the scale tank 32, is positioned on a platform 56 which in turn is secured to a yoke 57 that is hung from the scale beam 55.

Both the weight 53 and the platform 56 are provided with registering axial holes 61 and 62 passing vertically therethrough. The other weight 54, which corresponds to the quantity of liquid being weighed in the tank 32, say 2500 lbs., may be movably mounted on a post 63 which extends through holes 61 and 62 in weight 53 and platform 56 and is connected to and actuated by a diaphragm motor 64, of the pressure-operated, spring return type. The motor 64 operates to lift the weight 54 off the weight 53 when the discharge valve 39 is opened, as will be described hereinbelow.

As a safety measure both the scale tank 32 and the surge tank 33 may be provided with liquid level controllers 65, 66, 67 and 68 of any suitable type which limits the amount of liquid that can enter or be drained from either tank, thus preventing overflow of the tanks and insuring that a head of liquid always remains in the bottom of the tank to prevent any gas from blowing out through the liquid outlets 34 and 35. The liquid controller 65 is connected through conduits 27 and 27a with the diaphragm operating the discharge valve 16 in the line 15 between the separator 13 and the surge tank 33, whereby valve 16 is closed when the liquid level in tank 33 becomes too high in said tank.

The liquid level controller 66 near the bottom of the surge tank 33 is in communication through conduits 71 and 72 with the inlet valve 31 to the scale tank 32 to bleed pressure from the diaphragm of valve 31 causing it to close in order to maintain a fluid seal in the surge tank 33. The high level controller 67 in the scale tank 32 is also connected to the inlet valve 31 thereof through conduits 72 and 73 so as to close valve 31 when the liquid level in the tank 32 becomes excessive due to failure of other control mechanism. The low level controller 68 on the scale tank 32 communicates through conduits 74 and 75 with the outlet valve 39 of the tank 32 to close the valve in the event of excessive low fluid level in the scale tank 32.

Figure 4:
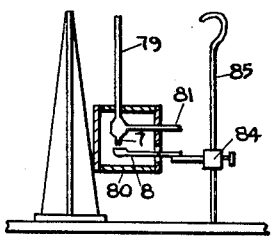
Figure 4 is a possible construction of pilot valve 80 of Figure 1.
Figure 5:
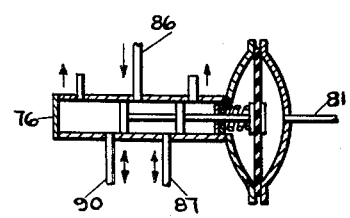
Figure 5 is a detailed cross-sectional view of diaphragm control valve 76 of Figure 1.

The pneumatic control system of the present oil metering apparatus includes a diaphragm-operated spring-return control valve 76 (Figures 1 and 5) which is operated by a flow of pressure fluid from conduit 41 on the downstream or low pressure side of the differential pressure controller 45. The pressure fluid from pipe 41 flows through conduit 77, gas supply regulator and trap 78, line 79, relay pilot 80 and conduit 81 to the diaphragm housing of the 4-way valve 76. The relay pilot valve 80, Figures 1 and 4, which may comprise a movable part 7 adapted to close a bleed nozzle 8, means of an actuating arm 84 fixedly secured to a scale rod 85.

Pressure fluid also passes to the 4-way control valve 76 through conduits 77 and 86. Depending upon the setting of the valve 76, pressure fluid from the valve is sent either through conduits 87, 88 and 75 to the diaphragm chamber of the discharge valve 39 leading to the scale tank 32, or to the diaphragm chamber of the inlet valve 31 of the scale tank through conduits 90, 91 and 72.

If desired, the present apparatus may be provided with automatic sampling means. As illustrated in Figure 1, a gauge glass 92 is mounted on the side of the scale tank with a diaphragm-operated 3-way pilot valve 93 of the spring-return type, positioned at the bottom of the glass which is in communication with inlet line 34 of the scale tank 32. A sample accumulator 94 of any desired size and type is provided for collecting a number of samples of liquid. The sample accumulator receives a sample from the gauge glass 92 through valve 93 and conduit 95 while a vent line 96 is provided between the top of the accumulator and the top of the scale tank 32. The 3-way valve in the sample gauge 92 is actuated by pressure fluid from the 4-way control valve 76 through conduits 87 and 88.

Since the scale tank 32 must be movable with the scale platform 50, all rigid pipe lines 43, 34 and 38 to and from the scale tank 32 are preferably provided with flexible connections such as bellows-type sleeves 97. Prior to operating the present metering apparatus, sufficient weights 54 are added to the scale as counterweights against the weight of oil, say, 2500 lbs., allowed to flow into the scale tank 32 at each filling thereof. The number of charges of oil which are weighed and pass through the scale tank 32 in any given period, say, 24 or 48 hours, are indicated and recorded by any suitable means as by a counter 98 which may be attached to either valve 31 or 39 or to the scale 50. As illustrated to Figure 1, the counter 98 is mounted on the discharge valve 39 of the scale tank 32 and is actuated each time the valve is opened.

In the operation of the present tank battery and metering system, well fluid comprising a mixture of oil and gas flows from the well's "Christmas tree" 10 into pipe line 11. The control valve 12 in the line 11 may be manually or automatically controlled. As illustrated in Figure 2, the valve 12 comprises a normally closed diaphragm valve which is opened by a pressure fluid being applied to the diaphragm housing of said valve through conduit 99, the pressure fluid being supplied from any suitable outside source (not shown).

The well fluid mixture passes into the horizontal separator 13 where the major part of the gas in the well fluid is separated therefrom and discharged through pipe 17. Some of the gas may be piped to the surge tank 33 through conduits 41 and 42 while another portion of the gas is discharged through conduit 58 and valve 18 and disposed of in any suitable manner. It is realized that in other installations all the gases collecting in the separator 13, surge tank 33 and scale tank 32 may be discharged directly to the atmosphere and flared. In the present tank installation a portion of the gas pressure coming from the well and handled by the system is utilized to drive the oil from tank to tank through the system.

Oil from the separator 13 flows through conduit 15 and valve 16 to the junction formed by the T connection 30. If the scale tank 32 is empty, the oil flows through inlet valve 31 into tank 32. On the other hand, if the scale tank 32 has been recently filled and is at that moment emptying, valve 31 is closed and the oil will flow through pipe 35 into surge tank 33. Any gas entrained in the oil will rise to the top of tank 33 and be discharged through conduit 42. At the same time the desired pressure differential between the surge tank 33 and the scale tank 32 may be maintained by differential pressure controller 45.

When the scale tank 32 is drained of its predetermined charge of oil, the scale beam 55 returns to its balanced position moving arm 84 so that it opens pilot valve 80 sending pressure fluid through conduit 79 to the diaphragm housing of control valve 76. The control valve is actuated by said pressure fluid so that pressure fluid from conduit 77 passes through valve 76 and conduits 90 and 91 to open the inlet valve 31 to the scale tank. At the same time pressure fluid is bled from the discharge valve 39 and the motor 64, causing the valve 39 to drop to its closed position while the deflated diaphragm motor 64 allows the counterweight 54 to drop down on the weight 53 so that the total weight is imposed on the scale 50 at the end of its beam 55.

With the inlet valve 31 open, oil continues to flow from the separator 13 and the surge tank 33 to the scale tank 32 until an amount of oil, say, 2500 lbs., equivalent to the counterweight 54 has entered the tank 32. When the predetermined amount of oil has entered the scale tank 32, the beam 55 moves up from its lower position to its balanced position. In doing so the beam 55 moves arm 84 which reverses the pilot valve 80. In turn the pilot valve bleeds pressure fluid through conduit 81 from the control valve 76 causing the latter valve to be reversed. This shuts off the pressure fluid to the inlet valve 31 allowing it to close.

Figure 3:
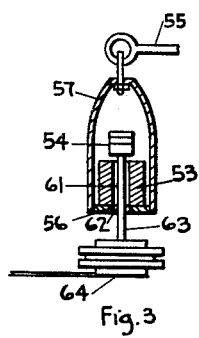
Figure 3 is a detailed view of the taring device of the present scale tank.

At the same time, movement of the control valve 76 puts conduits 77 and 87 in communication sending pressure fluid to the outlet valve 39 and to the motor 64, whereby the valve 39 is opened and the diaphragm motor 64 is inflated lifting the counterweight 54 off the other weight 53, in a manner illustrated in Figure 3, and causing the beam 55 to move to its uppermost position. The weight 53 remains in this raised position until 2500 lbs. of oil has drained from the scale tank and the scale beam 55 again returns to its balanced position, as previously described above. The cycle is then repeated continuously with the counter 98 on the discharge valve recording the number of cycles.

As the scale tank inlet valve 31 opens and the fluid level in the scale tank 32 rises, the hydrostatic head forces part of the incoming stream up into the sample tube or gauge glass 92 so that the fluid levels in the tank and glass are the same. Thus, a continuous sample is obtained in the gauge glass 92 from the incoming stream through line 34. When the predetermined weight of liquid has entered the scale tank 32 and the inlet valve 31 is closed, the diaphragm controlled valve 93 is reversed by pressure fluid from the control valve 76 at the same time that the discharge valve 39 is opened. Thus, while a charge of oil is draining from the scale tank 32, the fluid sample in the gauge glass 92 flows by gravity through conduit 95 into the sample accumulator 94 which is preferably maintained at the same pressure as the tank 32. When the discharge valve 39 is again closed, the valve 93 in the sample line is again reversed opening the conduit to the gauge glass 92 so that another sample may be collected. The sample accumulator may be emptied manually from time to time.

All of the stages of the tank battery and metering system are preferably maintained under differential pressures in order to move the oil more rapidly. The metering system is also provided with a number of safety devices. Should anything go wrong with the scale 50 or 55 or the pilot valve 80 so that the inlet valve 31 fails to close, the liquid level in the scale tank 32 would rise until it reached the upper float 67 which would be actuated so that pressure would be bled off of the inlet valve 31 causing it to close. The liquid would then fill the surge tank 33 until the fluid level reached the upper float 65 which would be actuated to bleed off the pressure from the separator dump valve 16, thus closing it.

The separator 13 then begins filling and the float controlled pilot 22 attempts to apply additional pressure to the dump valve 16. Due to the choke 29 in the supply line 28 to the dump valve 16 and the bleed off by the float controller 65 due to the high level in the surge tank 33, the dump valve 16 remains closed. At a certain supply pressure to the dump valve 16, a reverse acting pilot 9 of the diaphragm valve 14 in the inlet line to the separator 33 begins reducing the supply pressure to said valve 16 causing it to close. The supply pressure to the separator inlet valve 14 is reduced to zero, thus causing the valve 14 to close completely when the maximum supply pressure is supplied to it.

With the separator 13 shut in, the well flow lines build up pressure until the pilot-controlled valve 12 at the well head shuts in the well at a predetermined flow line pressure.

Rather than employing mechanical means such as the platform scale 51 (Figure 1) on which the scale tank 32 may be weighed or balanced against weights 53 and 54, the scale tank may be mounted on hydraulic or pneumatic weighing means such as pneumatic weigh-cells 111, 112, and 113 (Figure 6) which balance the scale tank against air pressure. Pneumatic weigh-cells, such as those shown in Bulletin 101S, John R. Monsell, Manufacturing Engineer—Pitman, New Jersey, are readily available in a number of forms which produce an output pressure signal proportional to the weight impressed on the weigh-cells.

In Figure 6, the scale tank 32 is illustrated with weigh-cells 111, 112, and 113 positioned under the legs 114, 115 and 116 of the tank. Operating fluid is supplied to the weigh-cells through conduit 117 with the pressure being controlled by any suitable type of regulator valve 118. The combined output fluid pressure signals from the weigh-cells are transmitted to a controller 119 which utilizes these signals to control the flow of fluid to and from the scale tank 32.

Crude oil flowing to the scale tank 32 passes through pipe line 120, inlet valve 121 and line 122. In the event that the valve 121 is closed, the fluid is diverted from line 120 into line 123 which communicates with a surge tank 33 and/or separator 13 as shown in Figure 1. Oil discharged from the scale tank flows through line 122 and valve 124 to the main storage tank (not shown). If desired, the valves 121 and 124 may be mechanically linked together and operated by a single diaphragm motor 125. The illustrated valves 121 and 124, together with motor 125, are arranged in a manner such that the application of air pressure through conduit 126 to the diaphragm motor 125 closes inlet valve 121 while simultaneously opening outlet valve 124. The motor 125 or valves 121 and 124 may be provided with spring means 127 for reversing the setting of the valves 121 and 124 when pressure fluid is removed from the motor 125.

Flow of fluid pressure to the diaphragm motor 125 is controlled by valve 128 which together with the diaphragm motor 129 and spring 130 forms a valve of the toggle-action type which is either fully opened to the air supply line 131 or to the exhaust port or line 132. Air pressure for operating the motor 129 is supplied through line 133 and a suitable pressure regulator 134 and may be bled off by the controller 119.

The controller 119 may comprise any suitable device for controlling the setting of valve 128 and/or valves 121 and 124 in response to the output pressure signals from the pneumatic weigh-cells 111, 112 and 113. For example, the controller may be of the balanced-beam type and comprise a beam 135 balanced at a fixed point 136, as schematically shown in Figure 6. Positioned on either side of one arm of the beam 135 are a pair of expansible bellows units 137 and 138. One end of each bellows unit is fixedly anchored within the controller casing while the other end is preferably provided with a bearing which normally is in contact with the beam 135. When a differential pressure exists between the two bellows, the beam 135 has a tendency to move away from the bellows at the higher pressure due to the expansion of said bellows.

The output pressure signals from the pneumatic weigh-cells 111, 112 and 113 are applied to bellows unit 137 through conduit 141. The sum of these pressure signals which tends to move the beam 135 in one direction is equivalent to the weight of the scale tank 32 and its contents, say, a charge of oil weighing 2500 lbs. Opposing the action of bellows 137 is bellows 138 to which is applied through conduit 142 and controller valve 143 a pressure equivalent to the tare weight of the scale tank 32.

Movably mounted within the controller 119 adjacent the other arm of the beam 135 is a weight 144 equivalent to weight 54 of Figure 1 adapted to be applied to the beam whenever the scale tank 32 is being filled. The weight 144 may be attached to a rod 145 which in turn is secured to and actuated by a diaphragm motor 146 or other suitable actuating means. The diaphragm motor 146 communicates with the pressure fluid line 126 through conduit 147 in such a manner that pressure is applied to the motor 146 which lifts the weight 144 from the beam 135 simultaneously with the opening of valve 124 in the discharge line 122 from the scale tank 32. The weight remains off the beam all the time the tank 32 is draining.

Fixedly mounted within the controller 119 is an air bleed nozzle 148 which directs a stream of air against the same side of the beam arm 135 to which the weight 144 is applied. Preferably the bleed nozzle 148 is mounted in the movable end of a bellows 149 which is supplied by air pressure through conduit 150 and valve 134.

In operation, with the scale tank empty the sum of the output pressures from the pneumatic weigh-cells 111, 112 and 113 which is transmitted to bellows 137 of the controller 119 is equivalent to the weight of the empty tank 32. An equal and opposing pressure, which is pre-set by adjustment of controller valve 143, is applied at all times to the bellows 138 and hence to the opposite side of the beam 138 which is in its neutral position when the tank 32 is empty. At the same time the beam 135 has moved away from bleed nozzle 148 allowing air to escape thus reducing the pressure within the bonnet of the diaphragm valve motor 129.

The spring 130 in valve motor 129 changes the position of valve 128 so that the air pressure in diaphragm motors 125 and 126 is exhausted to the atmosphere through conduits 126, 147 and 132. Removal of this air pressure causes inlet valve 121 to open and outlet 124 to close while weight 144 is dropped on the controller beam 135.

As the tank 32 fills with liquid, the increased weight caused by this operation is applied to the weigh-cells 111, 112 and 113 whose output pressure signals increase and are applied to bellows 137 and hence to beam 135. All the time air is bleeding through nozzle 148 and against the opposite arm of beam 135. As the charge of oil in the tank reaches the predetermined amount being weighed, the controller beam 135 is tilted closer and closer to the bleed nozzle 148 thus reducing the rate at which air pressure is bled off and increasing the air pressure to the diaphragm motor 129 of valve 128.

At the instant the full charge of oil is in the tank, the beam 135 closes the bleed nozzle to the extent that sufficient air pressure is applied to the valve motor 129 to move the valve 128 to its other position. The valve 128 then allows air pressure from conduit 131 to flow to diaphragm motors 125 and 146, opening drain valve 124 while closing inlet valve 121 and removing the weight 144 from the controller beam 135. The apparatus is now ready for another cycle. It is obvious that the scale tank 32 of Figure 6 could be connected to the surge tank 33 and/or the horizontal separator 13 of Figure 1 and still operate in the above-described manner.

In the event that only the surge tank 33 or the separator 13 (Figures 1 and 2) is employed, the single tank serves as both a surge tank and a gas separator to remove gas from a crude, oil-gas mixture. The volume of fluid passing through the present metering apparatus is determined readily by multiplying the weight of oil entering the scale tank 32 per cycle, say 2500 lbs., by the number of cycles indicated on the counter 98 since the last volume calculation. If the gravity of oil from the well or wells varies or is subject to change and it is desired to know the number of barrels of oil metered over a measured period, the total weight of oil is divided by the average weight per barrel of oil which is determined by measuring the gravity of a representative sample collected in container 94. No temperature correction for volume is necessary with the present system.

An actual installation of the present tank battery and oil metering system installed in a Permain Basin oil field was operated with an extremely high degree of accuracy. Test data show the accuracy of the present system to be within 0.5% of the conventional tank gauges which themselves are not 100% accurate. Additionally it was shown that the average difference between the present metering system and a conventional tank battery was only .009% over an extended period.

We claim as our invention:

1. A system for metering crude oil in a mixture of oil and gas being continuously produced under pressure from a well, comprising a surge tank having inlet and outlet ports open at all times to receive the flow of fluid from said well, conduit means connecting the well to the inlet port of the tank means for conveying the well fluid thereto, a scale tank having inlet and outlet port means, conduit means between the outlet port means of the surge tank and the inlet port means of the scale tank, discharge conduit means connected to the outlet port means of said scale tank for discharging liquid therefrom, alternately opening co-acting valves in said conduit means connected to the inlet and outlet port means of said scale tank, one of said valves being open while the other valve is closed, the valve in said conduit to the inlet port means of said scale tank alternately directing the flow of fluid from the well first into the scale tank and then into the surge tank means, weight indicating means positioned beneath the scale tank for weighing said tank, and transmission means between said weight indicating means and said inlet and outlet co-acting valves in said scale tank conduit means for actuating said co-acting valves in response to the weight of liquid admitted to said scale tank.

2. A system for metering crude oil in a mixture of oil and gas being continuously produced under pressure from a well, comprising a surge tank having liquid inlet and outlet ports open at all times to receive the flow of fluid from said well, conduit means connecting the well to the liquid port of the tank means for conveying the well fluid thereto, a scale tank having liquid inlet and outlet port means, conduit means between the liquid outlet port means of the surge tank and the liquid inlet port means of the scale tank, discharge conduit means connected to the outlet port means of said scale tank for discharging liquid therefrom, alternately opening co-acting valves in said conduit means connected to the liquid inlet and outlet port means of said scale tank, one of said valves being open while the other valve is closed, the valve in said conduit to the inlet port means of said scale tank alternately directing the flow of fluid from the well first into the scale tank and then into the surge tank means, weight indicating means positioned beneath the scale tank for weighing said tank, a weigh beam mounted adjacent said weight indicating means and responsive to the load placed thereon, transmission means between said weigh beam and said liquid inlet and outlet co-acting valves in said scale tank conduit means for actuating said co-acting valves in response to movement of said weigh beam, gas outlet ports in said surge tank and in said scale tank, conduit means in communication between said gas outlet ports, and pressure-regulating valve means in said conduit means for discharging a portion of the gas pressure therefrom and utilizing the other portion to drive the liquid through said system.

3. A system for metering crude oil in a mixture of oil and gas being continuously produced under pressure from a well, comprising a surge tank having liquid inlet and outlet ports open at all times to receive the flow of fluid from said well, conduit means connecting the well to the liquid inlet port of the tank means for conveying the well fluid thereto, a scale tank having liquid inlet and outlet port means, conduit means between the liquid outlet port means of the surge tank and the liquid inlet port means of the scale tank, discharge conduit means connected to the outlet port means of said scale tank for discharging liquid therefrom, alternately opening co-acting valves in said conduit means connected to the liquid inlet and outlet port means of said scale tank, one of said valves being open while the other valve is closed, the valve in said conduit to the inlet port means of said scale tank alternately directing the flow of fluid from the well first into the scale tank and then into the surge tank means, weight indicating means positioned beneath the scale tank for weighing said tank, a weigh beam mounted adjacent said weight indicating means and responsive to the load placed thereon, transmission means between said weigh beam and said liquid inlet and outlet co-acting valves in said scale tank conduit means for actuating said co-acting valves in response to movement of said weigh beam, first and second force units in contact with and acting against said weigh beam, the first force unit corresponding to the tare weight of the scale tank and the second force unit corresponding to the charge of oil being weighed, motor means connected to said second force unit, said motor means being energized by the opening of the valve in the discharge conduit means of the scale tank to remove said second force unit from contact with said weigh beam while the scale tank is being emptied, gas outlet ports in said surge tank and in said scale tank, conduit means in communication between said gas outlet ports, and pressure-regulating valve means in said conduit means for discharging a portion of the gas pressure therefrom and utilizing the other portion to drive the liquid through said system.

4. A system for metering crude oil in a mixture of oil and gas being continuously produced under pressure from a well, comprising a surge tank having inlet and outlet ports open at all times to receive the flow of fluid from said well, conduit means connecting the well to the inlet port of the tank means for conveying the well fluid thereto, a scale tank having inlet and outlet port means, conduit means between the outlet port means of the surge tank and the inlet port means of the scale tank, discharge conduit means connected to the outlet port means of said scale tank for discharging liquid therefrom, alternately opening co-acting valves in said conduit means connected to the inlet and outlet port means of said scale tank, one of said valves being open while the other valve is closed, the valve in said conduit to the inlet port means of said scale tank alternately directing the flow of fluid from the well first into the scale tank and then into the surge tank means, weight indicating means positioned beneath the scale tank for weighing said tank, a weigh beam mounted adjacent said weight indicating means and responsive to the load placed thereon, transmission means between said weigh beam and said inlet and outlet co-acting valves in said scale tank conduit means for actuating said co-acting valves in response to movement of said weigh beam, first and second force units in contact with and acting against said weigh beam, the first force unit corresponding to the tare weight of the scale tank and the second force unit corresponding to the charge of oil being weighed, and motor means connected to said second force unit, said motor means being energized by the opening of the valve in the discharge conduit means of the scale tank to remove said second force unit from contact with said weigh beam while the scale tank is being emptied.

5. The system of claim 4 in which the first force unit comprises an expansible bellows unit and conduit for supply at all times to said bellows a pressure fluid equivalent to the tare weight of the scale tank while the second force unit comprises a weight movable to and from the weigh beam by the motor means.

6. A system for metering crude oil in a mixture of oil and gas produced under pressure from a well, comprising a liquid-gas separator having inlet and outlet ports, conduit means connecting the well to the inlet port of the separator for conveying the well fluid thereto, a surge tank having inlet and outlet port means, conduit means between the separator outlet port and said surge tank inlet port means, a scale tank having inlet and outlet port means, conduit means between the outlet port means of the surge tank and the inlet port means of the scale tank, discharge conduit means connected to the outlet port means of said scale tank for discharging liquid therefrom, alternately opening co-acting valves in said conduit means connected to the inlet and outlet port means of said scale tank, one of said valves being open while the other valve is closed, a scale positioned beneath the scale tank for weighing said tank, a weigh beam mounted adjacent said scale and mechanically linked thereto, transmission means between said weigh beam and said inlet and outlet co-acting valves in said scale tank conduit means for actuating said co-acting valves in response to movement of said weigh beam, first and second weights supported on said weigh beam, the first weight corresponding to the tare weight of the scale tank and the second weight corresponding to the charge of oil being weighed, and motor means rigidly connected to said second weight, said motor means being energized by the opening of the valve in the discharge conduit means of the scale tank to remove said second weight from said weigh beam.

7. A system for metering crude oil in a mixture of oil and gas produced under pressure from a well, comprising a liquid-gas separator having liquid inlet and outlet ports, conduit means connecting the well to the inlet port of the separator for conveying the well fluid thereto, a surge tank having liquid inlet and outlet port means, conduit means between the separator outlet port and said surge tank liquid inlet port means, a scale tank having liquid inlet and outlet port means, conduit means between the liquid outlet port means of the surge tank and the liquid inlet port means of the scale tank, discharge conduit means connected to the liquid outlet port means of said scale tank for discharging liquid therefrom, alternately opening co-acting valves in said conduit means connected to the liquid inlet and outlet port means of said scale tank, one of said valves being open while the other valve is closed, a scale positioned beneath the scale tank for weighing said tank, a weigh beam mounted adjacent said scale and mechanically linked thereto, transmission means between said scale beam and said inlet and outlet co-acting valves in said scale tank conduit means for actuating said co-acting valves in response to movement of said weigh beam, first and second weights supported on said weigh beam, the first weight corresponding to the tare weight of the scale tank and the second weight corresponding to the charge of oil being weighed, and motor means rigidly connected to said second weight, said motor means being energized by the opening of the valve in the discharge conduit means of the scale tank to remove said second weight from said weigh beam, gas outlet ports in each of said separator, surge tank and scale tank, conduit means interconnecting said gas outlet ports, and pressure-regulating valve means in said conduit means for discharging a portion of the gas pressure therefrom and for maintaining pressure differentials between said separator and said surge tank and between said surge tank and said scale tank.

8. A system for metering crude oil in a mixture of oil and gas produced under pressure from a well, comprising a liquid-gas separator having inlet and outlet ports, conduit means connecting the well to the inlet port of the separator for conveying the well fluid thereto, a surge tank having inlet and outlet port means, conduit means between the separator outlet port and said surge tank inlet port means, a scale tank having inlet and outlet port means, conduit means between the outlet port means of the surge tank and the inlet port means of the scale tank, discharge conduit means connected to the outlet port means of said scale tank for discharging liquid therefrom, alternately opening co-acting pressure-actuated valves in said conduit means connected to the inlet and outlet port means of said scale tank, one of said valves being open while the other valve is closed, a scale positioned beneath the scale tank for weighing said tank, a weigh beam mounted adjacent said scale and mechanically linked thereto, transmission means between said scale beam and said inlet and outlet co-acting valves in said scale tank conduit means for actuating said co-acting valves in response to movement of said weigh beam, said transmission means comprising conduit means for applying a pressure fluid to said co-acting valves, pressure-actuated control valve means in said fluid-pressure conduit means for directing the flow of pressure fluid first to one of said co-acting valves and then the other, conduit means for applying a pressure fluid to said control valve means, and pilot valve means in said control valve conduit means, said pilot valve means being mounted adjacent said weigh beam and actuated thereby, first and second weights supported on said weigh beam, the first weight corresponding to the tare weight of the scale tank and the second weight corresponding to the charge of oil being weighed, and motor means rigidly connected to said second weight, said motor means being energized by the opening of the valve in the discharge conduit means of the scale tank to remove said second weight from said weigh beam.

9. A system for metering crude oil in a mixture of oil and gas produced under pressure from a well, comprising a liquid-gas separator having inlet and outlet ports, conduit means connecting the well to the inlet port of the separator for conveying the well fluid thereto, a surge tank having inlet and outlet port means, conduit means between the separator outlet port and said surge tank inlet port means, a scale tank having inlet and outlet port means, conduit means between the outlet port means of the surge tank and the inlet port means of the scale tank, discharge conduit means connected to the outlet port means of said scale tank for discharging liquid therefrom, alternately opening co-acting diaphragm valves in said conduit means connected to the inlet and outlet port means of said scale tank, one of said valves being open while the other valve is closed, pneumatic weigh cells positioned beneath the scale tank for weighing said tank, a weigh beam controller mounted adjacent said scale and pneumatically linked thereto, transmission means between said weigh beam and said inlet and outlet co-acting diaphragm valves in said scale tank conduit means for actuating said co-acting valves in response to movement of said weigh beam, said weigh beam controller comprising first and second force units in contact with and acting against said weigh beam, the first force unit corresponding to the tare weight of the scale tank and the second force unit corresponding to the charge of oil being weighed, and diaphragm motor means rigidly connected to said second force unit, said motor means being energized by the opening of the valve in the discharge conduit means of the scale tank to remove said second weight from said weigh beam, and a third force unit in contact with said weigh beam and acting in opposition to said first and second force units, said third force unit corresponding to the weight of the scale tank as fluid is admitted thereto.

10. The system of claim 9 wherein said first and third force units comprise pressure expansible bellows units and said second force unit comprises a mass weight, first conduit means in communication with said first force unit for applying thereto constant pressure corresponding to the tare weight of the scale tank, second conduit means interconnecting said pneumatic weigh cells with the third force unit, and wherein said transmission means between said weigh beam and said inlet and outlet co-acting diaphragm valves of said scale tank comprises third conduit means connecting said diaphgarm valves and said diaphragm motor means to a pressure fluid supply for actuating said valves and said motor means, a diaphragm control valve in said third conduit means for regulating the flow of pressure-actuating fluid to and from said co-acting valves and motor means, fourth conduit means connecting said diaphragm control valve with a pressure fluid supply for actuating said valve, and a pilot valve in said fourth conduit means for regulating the flow of pressure-actuating fluid to the control valve, said pilot valve comprising a bleed nozzle mounted adjacent the weigh beam, the opening of said nozzle being controlled by the movement of said weigh beam in first one direction and then the other.

11. A system for metering crude oil from a well comprising a scale tank having liquid inlet and outlet port means, conduit means connected between the well and the liquid inlet port means of the scale tank, discharge conduit means connected to the outlet port means of said scale tank, alternately opening so-acting inlet and outlet valves in said conduit means connected to the inlet and outlet port means, one of said valves being open while the other valve is closed, weight measuring means supporting the scale tank, a weigh beam connected to said weight indicating means and responsive to the load placed thereon, transmission means between said weigh beam and said liquid inlet and outlet co-acting valves in said scale tank conduit means for actuating said co-acting valves in response to movement of said weigh beam, first and second balancing force units in contact with said weigh beam, the first balancing unit acting against the beam with a force equal to the tare weight of the scale tank and the second balancing unit acting against the beam with a force equal to the charge of oil being weighed, motor means connected to said second force unit, control circuit means energized by the opening of the valve in the discharge conduit means of the scale tank for actuating said motor means to remove said second balancing force unit from contact with said weigh beam while the scale tank is being emptied, and gas outlet port means in said scale tank.

12. A system for metering crude oil from a well, comprising a scale tank having inlet and outlet port means, conduit means connected between the well and the inlet port means of the scale tank, discharge conduit means connected to the outlet port means of said scale tank, alternately opening co-acting inlet and outlet valves in said conduit means connected to the inlet and outlet port means of said scale tank, one of said valves being open while the other valve is closed, weight measuring means supporting the scale tank for weighing said tank, a weigh beam connected to said weight indicating means and responsive to the load placed thereon, transmission means between said weigh beam and said inlet and outlet co-acting valves in said scale tank conduit means for actuating said co-acting valves in response to movement of said weigh beam, first and second balancing force units in contact with and acting against said weigh beam, the first force unit comprising an expansible bellows unit, conduit means for supplying at all times to said bellows a fluid pressure equal to the tare weight of the scale tank, the second balancing force unit comprising a weight equal to that of the oil being weighed, and motor means connected to said second balancing force unit, said motor means being energized by the opening of the valve in the discharge conduit means of the scale tank to remove said second balancing force unit from contact with said weigh beam while the scale tank is being emptied.

References Cited in the file of this patent

UNITED STATES PATENTS

| Number | Name | Date |
| --- | --- | --- |
| 1,978,558 | Van Der Horst | Oct. 30, 1934 |
| 2,020,849 | Muller | Nov. 12, 1935 |
| 2,140,811 | Poole | Dec. 20, 1938 |
| 2,154,175 | Mayo | Apr. 11, 1939 |
| 2,167,160 | Raymond | July 25, 1939 |
| 2,197,204 | Cooper | Apr. 16, 1940 |
| 2,493,095 | Williams | Jan. 3, 1950 |
| 2,505,905 | McAfee | May 2, 1950 |
| 2,582,387 | Macneish | Jan. 15, 1952 |
| 2,594,157 | Hadley | Apr. 22, 1952 |
| 2,633,750 | Langstaff | Apr. 7, 1953 |

FOREIGN PATENTS

| Number | Country | Date |
| --- | --- | --- |
| 677,850 | Germany | July 4, 1939 |